United States Patent
Robison et al.

(10) Patent No.: US 6,793,198 B2
(45) Date of Patent: Sep. 21, 2004

(54) BANDED VALVE PLUG HEAD

(75) Inventors: Jeffrey C. Robison, Provo, UT (US); Stephen R. Chipman, Provo, UT (US); Craig C. Smith, Provo, UT (US)

(73) Assignee: Caldera Engineering, LLC, Provo, UT (US)

( * ) Notice: Subject to any disclaimer, the term of this patent is extended or adjusted under 35 U.S.C. 154(b) by 0 days.

(21) Appl. No.: 09/253,793

(22) Filed: Feb. 22, 1999

(65) Prior Publication Data

US 2001/0013587 A1 Aug. 16, 2001

(51) Int. Cl.$^7$ ................................................ F16K 1/48
(52) U.S. Cl. ........................................ 251/357; 251/368
(58) Field of Search ............................... 251/357, 356, 251/368, 88, 84, 85, 86, 87

(56) References Cited

U.S. PATENT DOCUMENTS

| | | | | |
|---|---|---|---|---|
| 854,698 A | * | 5/1907 | Martell | 020/53 |
| 1,963,685 A | * | 6/1934 | Shimer | 251/357 |
| 2,678,187 A | * | 5/1954 | Peters | 251/357 |
| 3,326,512 A | * | 6/1967 | Clarke | 251/86 |
| 3,581,818 A | | 6/1971 | Kinley | 166/332.5 |
| 4,044,834 A | | 8/1977 | Perkins | 166/53 |
| 3,558,098 A | * | 4/1982 | Puster | 251/88 |
| 4,325,647 A | * | 4/1982 | Maier et al. | 403/29 |
| 4,342,406 A | | 8/1982 | Lee | 137/576 |
| 4,442,996 A | | 4/1984 | Erwin | 251/77 |
| 4,497,467 A | | 2/1985 | DeWald et al. | 251/78 |
| 4,598,895 A | | 7/1986 | DeWald et al. | 251/78 |
| 4,771,803 A | | 9/1988 | Berchem et al. | 137/375 |
| 4,791,953 A | | 12/1988 | Berchem | 137/375 |
| 4,815,704 A | | 3/1989 | Berchem | 251/315.4 |
| 4,911,403 A | | 3/1990 | Lockwood, Jr. | 251/83 |
| 4,923,173 A | * | 5/1990 | Szymaszek et al. | 251/356 |
| 5,007,614 A | | 4/1991 | Lockwood, Jr. | 251/83 |
| 5,353,832 A | | 10/1994 | Berchem | 137/375 |
| 5,386,967 A | | 2/1995 | Enniss et al. | 251/315 |
| 5,503,122 A | * | 4/1996 | Ritland et al. | 123/188.3 |
| 5,605,172 A | | 2/1997 | Schubert et al. | 137/1 |
| 5,618,026 A | | 4/1997 | Geyer | 251/298 |

\* cited by examiner

Primary Examiner—David A. Scherbel
Assistant Examiner—Eric Keasel
(74) Attorney, Agent, or Firm—Lloyd W. Sadler

(57) ABSTRACT

A valve plug design is disclosed that uses a plug head band and a retaining ring to restrain a valve plug head to a valve plug stem. This invention is specifically directed to providing valve plugs where the plug head material is different and distinct from the plug stem material and where each material is selected to optimize its performance. Moreover, this invention is provided with a means for fixing and removing the plug head to and from the plug stem that can easily be worked in the field without special purpose manufacturing equipment, thereby making the maintenance, repair and replacement of plug head easier for users. This valve plug design subjects the plug head to reduced stresses thereby enhances the operating life of the valve and valve plug. This valve plug design provides a shock absorbing, compliance barrier around and/or under the plug head. This invention also provides a more uniform and broadened contact surface between the plug head and the plug stem, further reducing mechanical stresses to the plug head. This plug head invention requires less material and thus leads to reduced manufacturing costs and does not require welding to fasten the plug head to the plug stem, thereby permitting heat treatments as required without adverse impacts to the plug head to plug stem joint. Also, this invention is adapted to function in cooperation sensors embedded at the plug head—valve plug stem interface to permit the monitoring of alignment stresses on the valve plug head.

5 Claims, 4 Drawing Sheets

BANDED VALVE PLUG HEAD

BACKGROUND OF THE INVENTION

1. Field of the Invention

This invention relates to industrial valves. More specifically, this invention relates to valve plug heads for industrial valves. Still more specifically, this invention relates to valve plugs which employ dissimilar materials and devices for attaching valve plug heads to valve plug stems.

2. Description of Related Art

Valves, valve plugs and associated components are well known in the art. Valve plug heads are generally positioned within the valve in the middle of the flow stream to control the volume of flow that is allowed to pass through the valve. By varying the position of the plug head relative to the valve seat control of the flow volume is achieved. In sum, the valve plug head is used within a valve to divert and restrict flow. Plug heads are subjected to fluid forces, chemical attack, thermal stresses, impact from particulates and debris, as well as the forces used to attach it to the plug stem. Additionally, the plug head is subjected to seat loading forces should it contact the valve seat.

The typical valve head is attached to a plug stem, which in turn is connected to an actuating device. This actuating device, which is typically positioned outside the internal portion of the valve, is controlled to move the plug stem, thereby changing the position of the plug head and controlling the volume of flow passing through the valve. Thus the attachment between the plug stem and the plug head is inside the valve, exposed to the flow stream, while the actuator and the attachment between the actuator and the plug stem are outside the valve and are not exposed to the flow stream. Typically, between the internal portion of the valve stem, which is exposed to the flow stream, and the external portion of the valve stem, which is connected to the actuator, is a smooth cylindrical section that is used as a sealing surface. Valve packing is placed around and against this cylindrical section, permitting in and out movement of the plug stem, without flow stream leakage out of the valve. The plug stem is therefore subjected to axial forces as the actuator moves it, mounting forces relating to the actuator attachment, and the long cylindrical section is subjected to bending forces. The plug head and the plug stem perform distinctly different purposes and are subjected to very different forces. The plug head, sitting in the middle of the flow stream, diverts and/or restricts flow, and is subjected to fluid and seat loading forces and to forces related to attaching the plug head to the plug stem. While the plug stem, adapted to be moved by an actuating device provides a sealing surface and is subject to axial and bending forces. In industrial, high volume, high flow rate valves these forces on plug stems and plug heads are typically significant contributors to valve failure.

Traditionally, valve plug heads are either composed of one monolithic material or make use of more than one material. Plug heads employing more than one type of material have particular advantages, in particular better erosion and corrosion resistance, improved shock absorption, working life, and thermal expansion qualities. However, typically the use of a plurality of material types has been limited by the ability to effectively join the materials together economically and without creating stress points that limit the life of the plug head. The most common current methods of fixing dissimilar materials together in a valve plug are taper fitting or interference fitting, both of which employ a retaining ring that is fixed around the plug head.

Taper fittings have been shown to subject the plug head to undesirable stresses, contribute to thermal expansion problems and are not practical to repair. The typical taper fitting design requires a mating of two conical surfaces, one on the plug head, and the other on the retaining ring. Since neither the plug head nor the retaining ring can be manufactured to completely ideal cone shapes, the plug and seat may not mate perfectly, therefore loading between the two when mated may not be uniform. Moreover, the force of the retaining ring on the plug head, that holds the plug head in place, is located close to the edge of the plug head and is generally perpendicular to the angle of the conical surface. The location and angle of this force are undesirable because they introduce tensile forces into the portion of the plug head that bears the force. Often the desired plug head material may demonstrate weak tensile strength, therefore, introducing additional tensile forces may either limit the selection of plug head materials or, if desired plug head materials are used, may tend to break off the edge of the plug head, separating the plug head from the plug stem and causing valve failure. Also, as the retaining ring wears away, through corrosion and erosion, the shape of the contact area can change, typically moving closer to the edge of the plug head. This contact area change tends to concentrate forces on the edge of the plug head and increases the likelihood that the edge of the plug head will fracture, thereby also causing the plug head to separate from the plug stem. The stresses induced with the taper fit are difficult to quantify and, therefore, can detract from a valve plug's performance. The stresses are difficult to predict because the plug head is held in place by the retaining ring and the retaining ring is attached to the plug stem via welding. Variables in the welding process such as weld shrinkage, inter-pass temperature, amperage of weld, inert gas environment, number of passes between welding pauses, the amount of initial burn in, as well as other related welding factors can change the amount of stress in the plug head.

As noted above, typical prior taper fit designs attach the taper fit ring to the plug stem via welding. This approach results in the retaining ring and the plug stem essentially becoming permanently joined into one component. If the plug head wears away or breaks and the plug stem is still usable, the typical taper fit design does not lend itself to achieving the proper concentricity between the plug head and the plug stem after the plug head has been replaced. When taper fit valve plugs are originally manufactured, the plug stem is the last portion of the plug to be machined. This is done so that it can be machined concentric with the plug head. When a taper fit valve plug is repaired, the plug stem has already been machined, so it is not possible to make adjustments in the plug stem to ensure concentricity with the plug head. Also, if the plug head is misaligned, when the taper fit ring is welded in place, adjustments cannot be made for concentricity without cutting the taper fit ring off again. Since the welding of the taper fit ring involves difficult to predict shrinkage and distortion of the taper fit ring, it is not generally possible to assure that the plug head will be properly concentric with the plug stem after the taper fit ring is welded in place. For these reasons, it is the current industry practice to discard taper fit valve plugs when the plug head has broken or worn away, rather than to attempt to repair them.

Additionally, with many plug head material classes, the coefficient of thermal expansion is less than that of many taper fit ring material classes. Generally, in assembling the part, the taper fit ring is fit tightly around the ceramic and the taper fit ring is welded to the plug stem. At elevated operating temperatures, the taper fit ring increases in size more than the plug head, and the plug head becomes somewhat loose in the taper fit ring, thereby leading to early failure of the fit in operating conditions.

Interference fittings typically require a bulkier retaining ring, contributing to the load on the plug head; a complex difficult procedure to replace plug heads; and are generally limited in their service temperature ranges. An interference fit achieves more uniform loading of the plug head than does the taper fit. However, the typical interference fit uses a one-piece retaining ring that not only holds the plug head but also attaches the plug head/retaining ring assembly to the plug stem and which must have sufficient material to allow for the wear due to erosion and corrosion without causing the plug head to separate from the plug stem. This requirement results in a bulkier retaining ring than is actually required to hold the plug head in place, and thereby contributes to an additional load on the plug head. This additional load introduces tensile stresses, which tend to contribute to plug head breaking and separation, thereby resulting in valve failure. The shape of the interference fit rings makes it difficult to assess loads and to determine the stresses on the plug head resulting from the portion of the ring that does not contact the plug head. Even using complex finite element analysis (FEA) models, a variety of assumptions are required to determine the value and direction of these stresses.

While acceptable concentricity between the plug head and the plug stem can be achieved with prior interference fit designs, nevertheless, the task of replacing the plug head is quite complex. To replace the plug head, first the interference fit ring must be cut, separating the plug head and ring assembly from the plug stem. This is usually performed on a lathe or mill. After cutting the interference fit ring/plug assembly, if the ring is to be used again, it is necessary to separate the ring from the plug head. Since, the ring and plug head are interference fit together, separating them can be exceptionally difficult. With certain combinations of plug head and interference fit ring materials, they can be separated by placing the assembly in an industrial oven and heating. If the coefficient of thermal expansion of the retaining ring is sufficiently higher than the plug head, the retaining ring will expand more quickly and the interference fit will be negated as a space forms between the two surfaces. This approach is somewhat destructive and requires that the interference-fit ring be carefully checked before reuse. Also, this heating method only works with certain combinations of materials. For example, if the plug head has a larger coefficient of thermal expansion than the interference fit ring, as when the interference fit ring is made from titanium or zirconium and the plug head is made from MgO ZrO2 ceramic, then heating increases rather than decreases the amount of interference between the parts. Moreover, even when it may work, the plug head replacement process requires specialized manufacturing facilities, that are generally unavailable to users in remote locations. Therefore, replacing plug heads for valve plugs is not a typical industry practice for certain combinations of materials or user locations.

Another problem with interference fittings is that service temperature ranges are limited because of differential thermal expansion between the plug head and ring materials. Typically, the first step in interference fit plug design is to determine how much interference between the plug head and the ring is required at operating temperature in the valve to ensure that the plug head is held securely in place. Next, a determination is made as to how much interference would exist at ambient temperatures. In many cases, the class of plug head material has a lower coefficient of thermal expansion than does the interference fit ring. Therefore, the amount of interference is greater at ambient temperature than at operating temperature. For example, a valve plug might have 0.002" of diametrical interference between the plug head and the ring at an operating temperature of 300° Fahrenheit. As the valve plug cools, the ring shrinks in size more than the plug head, and at ambient temperature the interference could be as much as 0.007". The amount of interference between the plug head and the ring is directly related to the amount of stress in a plug head. The amount of interference at ambient temperature becomes a concern when it places large amounts of stress on the plug head. Thus, when the valve plug is installed and is warming to operating temperature, the plug head is more highly stressed and is more vulnerable to failure. It has also been observed that because of these stresses certain valve plugs, head and rings, could not be used because the ambient temperatures, or below ambient storage temperatures, could cause the plug head to fail before they could placed into service.

Also, both taper fittings and interference fittings suffer from the impracticalities of stress relieving heat affected weld zones with heat treatments. For highly corrosive fluid applications and with certain materials, it is important to stress relieve heat affected weld zones with heat treatments. With both prior existing taper fit and interference fit designs, this has not been considered practical because stress-relieving typically is performed at temperatures high enough to allow the plug head to be excessively loose in the ring, and it is not possible to assure that the plug head would return to its proper position upon cooling. Therefore, even though heat treatments might be beneficial, they have generally been avoided.

For general background material, the reader is directed to United States patent Nos. each of which is hereby incorporated by reference in its entirety for the material disclosed therein.

U.S. Pat. No. 3,581,818 describes a flow control apparatus that includes a valve, choke or other flow control element adapted to be seated and unseated in a well pipe, wherein means are provided for moving the flow control element longitudinally into position adjacent to but out of sealing contact with a port in the well pipe to be closed, and thereafter laterally into sealing contact with the well pipe around the port.

U.S. Pat. No. 4,044,834 describes a device and method for controlling the flow of fluid from a well bore, that comprises a fluid control valve place in the choke line of a well and has a shaped helical or spiral duct formed in one embodiment by a tapered screw-like plug engaging a hollow sleeve.

U.S. Pat. No. 4,342,406 describes a liquid dispenser having an outer tank and an inner tank or trap at the bottom thereof with an inlet from the outer tank and features a proportioning device at the inner tank inlet, which includes an inverted cup-like member with a floating check ball therein.

U.S. Pat. No. 4,442,996 describes a tapered rotary valve plug that is provided with an operating head and handle assembly for rotating and axially shifting the valve plug relative to its seat.

U.S. Pat. No. 4,497,467 describes a rotary plug valve that has hydraulically actuated seals for sealing between a valve body and a rotatable valve plug.

U.S. Pat. No. 4,598,895 describes a valve having a body with an inlet duct, an outlet duct and a plug rotatably disposed in the body.

U.S. Pat. No. 4,771,803 describes a ball cock with a sinter ceramic valve seat and valve ball for a fluid, which contains abrasive particles.

U.S. Pat. No. 4,791,953 describes a regulator and shut-off valve for use in a corrosive media.

U.S. Pat. No. 4,815,704 describes a ball valve that comprises a pressure tight housing, a valve ball, an operating shaft, and a valve seat.

U.S. Pat. Nos. 4,911,403 and 5,007,614 describes a pressure responsive two-way shut-off valve for use with high-pressure gas cylinders, which is adapted to automatically retain residual pressure in the cylinder.

U.S. Pat. No. 5,353,832 describes a ball cock for fluids carrying abrasive materials that has its inlet passage terminating with a smaller cross section than the mouth of a ball passage which, in turn, has a smaller cross section than the mouth of the outlet passage aligned therewith.

U.S. Pat. No. 5,386,967 describes a coupler for use in a rotary ball valve having a spherical ball with a passageway therethrough controlling the flow of fluid through the valve.

U.S. Pat. No. 5,605,172 describes a fluid control valve and method for subjecting a liquid to a controlled pressure drop.

U.S. Pat. No. 5,618,026 describes a hybrid rotary control valve for use on existing rotary concentric control valve, or ball valve platforms.

SUMMARY OF THE INVENTION

It is desirable to provide a valve plug design that uses a plug head band and a retaining ring to attach the valve plug head to its valve plug stem, and to thereby provide a means of employing different materials for the plug head and the plug stem, where the different materials are selected specifically to address the different function of the plug head and the plug stem. This type of plug design is particularly desirable for use in flow streams that are erosive or corrosive in nature, because plug heads in these kinds of streams typically suffer material loss due to the erosion and/or corrosion. After a certain amount of material is lost, the plug head becomes ineffective at controlling the flow within the valve and needs to be replaced. Often the plug head wears out before other valve components. Therefore, minimizing the occurrences when the plug head fails and must be replaced is very desirable in improving the life cycle and efficiency of the valve.

Moreover, it is desirable to provide a design for plug heads and plug stems that permits the use of plug head materials, which are highly corrosion and erosion resistant and permits the use of plug stem materials, which can be easily machined, have good tensile strength, are reasonably ductile, and can be polished to a very smooth surface. Therefore, it is also desirable to provide a design for plug heads and plug stems that reliably joins highly dissimilar materials without inducing undesired stresses or thermal shock failures. It is also desirable to provide a valve plug head and stem design which can be serviced and repaired at the user site.

Therefore, it is the general object of this invention to provide a valve plug design that permits the use of different materials for the plug head and the plug stem.

It is a further object of this invention to provide a valve plug that uses a corrosion resistant material for the plug head.

It is another object of this invention to provide a valve plug that uses an erosion resistant material for the plug head.

A further object of this invention is to provide a valve plug design that permits the valve plug head to be repaired or replaced in the field with a minimum of special manufacturing equipment and procedures.

Another object of this invention is to provide a valve plug that uses a plug stem material that is easily machined.

A still further object of this invention is to provide a valve plug that uses a plug stem material that has good tensile strength.

A further object of this invention is to provide a valve plug that uses a plug stem material that is reasonably ductile.

It is a further object of this invention to provide a valve plug that uses a plug stem material that can be polished to a smooth surface.

It is another object of this invention to provide a valve plug design that minimizes plug head stresses.

Another object of this invention is to provide a valve plug design that minimizes thermal stresses.

A further object of this invention is to provide a valve plug design compatible with post-weld heat treatments to provide stress relief at weld zones.

A still further object of this invention is to provide a valve plug that uses a retaining ring to attach the valve plug head to the valve plug stem.

It is a further object of this invention to provide a valve plug having a band placed around the valve plug head, using an interference fit, where the band has contours that match up to contours in the retaining ring.

It is another object of this invention to provide a valve plug design that imposes a uniform stress on the plug head.

It is a still further object of this invention to provide a valve plug design that permits the use of one alloy for the plug head band and a different alloy for the band retainer and a third alloy for the plug stem.

An additional object of this invention is to provide a valve plug design that lowers the overall cost of materials.

A further object of this invention is to provide a valve plug design that simplifies the task of replacing worn out plug heads.

Another object of this invention is to provide a valve plug having a shock absorbing barrier around the plug head band, permitting the plug head to "give" and adjust its alignment in response to trying to close the valve on a piece of scale or debris in the flow.

An additional object of this invention is to provide a valve plug having a shock absorbing barrier around the plug head band, permitting the plug head to "give" and adjust its alignment in response to trying to close the valve in the valve seat to shut off the flow through the valve.

It is a further object of this invention to provide a valve plug having designed in compliance which allows the plug head to "self align" with the seat, thereby making critical alignment during manufacturing and servicing less critical.

It is a still further object of this invention to provide a valve plug having a compliant joint, whereby the head seats optimally in the valve seat without the creation of excessive forces or stresses.

It is another object of this invention to provide a valve plug where the compliant joint is provided with a "smart" actuator to allow the actuator to adapt to wear or erosion of the valve head. The actuator being provided with a control means such that the actuator will close until the force in the compliance reaches some predetermined level, rather than controlling the position of the head open-loop.

Another object of this invention is to provide a valve plug having a compliant joint that allows the head to self-center on the seat.

Still another object of this invention is to provide a valve plug having a compliant joint that reduces the stresses created by dynamic loading of the head, as when debris in the flow field strikes the head or when the head strikes the seat.

Another object of this invention is to provide a joint which allows placement of sensors to permit monitoring of plug head conditions.

A still further object of this invention is to provide a valve plug designed so as to allow interchangeable heads with a variety of valve stem designs.

It is another object of this invention to provide a valve plug having reduced manufacturing costs because of relaxation of head-seating tolerances.

It is a still further object of this invention to provide a valve plug where the retention band temperature expansion is matched to the head temperature expansion and is independent of the stem temperature expansion.

A further object of this invention is to provide a valve plug having a thermally-insulating barrier around the plug head band.

It is a further object of this invention to provide a valve plug providing improved uniformity and a broad contact between the plug head and the plug head band.

It is a still further object of this invention to provide a valve plug using less material.

It is another object of this invention to provide a valve plug that requires no welding to attach the plug head to the plug stem, for certain applications.

Another object of this invention is to provide a valve plug that can use selected pin materials to attach the retainer while using an interference fit to hold the band retainer tightly to the plug stem.

A still further object of this invention is to provide a valve plug that joins together materials that are not easily welded, brazed, coated or glued together because of material properties or service conditions.

It is another object of this invention to provide a valve plug design that reduces assembly stresses and makes it easier to predict and control stresses before, during and after the intended service of the plug.

These and other objects of this invention are intended to be covered by this disclosure and will be readily apparent to those of ordinary skill in the art upon review of the following drawings, detailed description, claims and abstract or may be learned from the practice of the invention. The objects and other advantages of this invention may be realized and attainted by means of the instrumentalities and combinations particularly pointed out in the appended claims. As will be realized, this invention is capable of different embodiments, including but not limited to different materials and dimensions, and are capable of modification in various important aspects without departing from the invention. Accordingly, the drawings and descriptions should be regarded as illustrative in nature and not as restrictive.

To achieve the foregoing and other objectives, and in accordance with the purposes of the present invention includes a plug head, a plug stem, a band retainer, a plug band, one or more retention pins and a plug stem base, which when assembled provides the improved valve plug head/stem of this invention.

BRIEF DESCRIPTION OF THE DRAWINGS

The accompanying drawings incorporated in and forming a part of the specification, illustrate a preferred embodiment of the present invention. Some although not all, alternative embodiments are described in the following description. In the drawings.

Reference is now made in detail to the present preferred embodiment of the invention an example of which is illustrated in the accompanying drawings.

DETAILED DESCRIPTION OF THE PREFERRED EMBODIMENT OF THE INVENTION

This invention is a valve plug design that uses a plug head band and a retaining ring to attach valve plug heads to valve plug stems. In particular, this invention is adapted to address the requirements of valves used in industries, such as mining, chemical processing, and oil and gas refining, where the flow is abrasive and/or corrosive and which may contain substantial quantities of sediment, debris or scale. Valves in certain erosive and/or corrosive flow streams encounter a significant amount of sediment, debris or scale which comes through the pipe line. Often erosive flow streams such as slurries form a scale on the internal walls of pipes, tanks and vessels through which the slurry flows. This scale can become hard and refractory. From time to time as the scale breaks away from the inside walls, it joins with the flow stream and travels through the subject valves. This invention is adapted to pass this scale and other debris while avoiding much of the stresses caused by the valve plug attempting to close on scale or debris.

Moreover, this invention provides plug heads and stems being made of dissimilar materials having different properties that optimize the performance of the plug head, the plug stem and the fastening band.

Also, this invention is adapted to ease the process of repair and replacement of valve plug components, permitting maintenance to be accomplished in the field without requiring specialized manufacturing equipment or highly skilled personnel.

Figure 1:
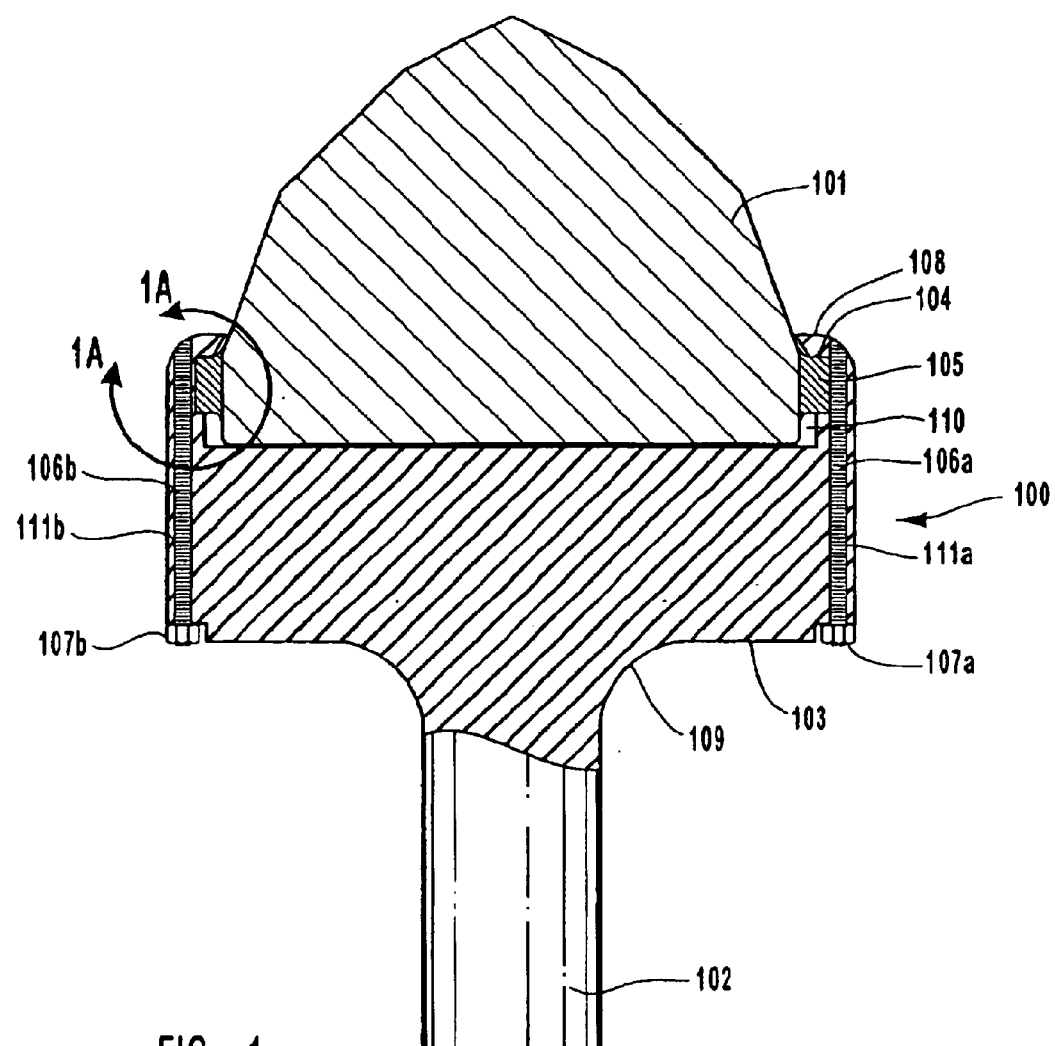
FIG. 1 depicts a section view of the preferred plug head mounted in the preferred plug stem of this invention.
Figure 1A:
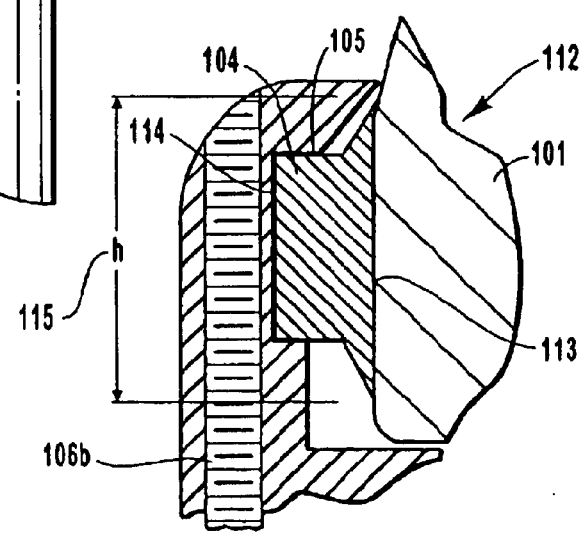

Referring now to the figures and in particular to FIG. 1, a section view of the preferred plug head and plug stem of the present invention is illustrated. The preferred valve plug 100 is shown having a plug head 101 held in a plug stem base 103 which in turn is mounted on the plug stem 102. The preferred plug stem base 103 has a cavity 110 for receiving the plug head 101. Within the walls of the cavity 110 of the plug stem base 103 is a recess 105 for receiving the plug head band 104. Also, provided in the plug stem base 103 are a plurality of bolt holes 111a,b adapted to receive a plurality of bolts 106a,b. The plug head 101 is held in the plug stem base 103 by a plug head band 104 which provides a broad interference fit between the plug head 101 and the recess 105 in the plug stem base cavity 110. A band retainer 108 is fitted over the plug head band 104 and is tightly held in place by the plurality of bolts 106a,b. In the preferred embodiment of the invention, the bolts 106a,b are fixed in place by nuts 107a,b. Alternatively, the band retainer 108 can be held in place to the plug stem base 103 by pins, screws, welds, brazing, clamps or the equivalent. A shoulder 109 of the plug stem base 103 provides a good fit to the valve stem support (or shaft support) (see 206 of FIG. 2).

An inset 112 detail view of the cross-section of the plug head band 104 is shown to provide additional detail of the preferred shape of the band 104. This preferred band 104 has a first side 113 for contacting the plug head 101 and a second side 114 opposite the first side 113, sized to fit tightly to the inside of the recess 105 of the plug stem base 103 cavity 110. Preferably, the first side 113 is significantly larger in height 115 than the second side 114. This plug band 104 shape serves both to enhance the surface contact area of the first side 113 and to provide shock absorbing capabilities, thereby providing stress relief to the plug head 101 during use.

The preferred plug head 101 is composed of structural ceramics because of its resistance to wear and degradation in flow streams that are erosive (having fine-grit particles) and corrosive (due to the chemical composition of the flow). Structural ceramics are a class of materials that includes, but is not limited to silicon carbide, silicon nitride, aluminum oxide, zirconium oxide, tungsten carbide, whisker-reinforced blends of ceramics, two-phase ceramics and the like. Alternative materials which may be substituted for structural ceramics for the plug head 101, include, but are not necessarily limited to, cermets, which are compounds that are combinations of ceramics and metals, cast iron, silicon iron, white iron, heat treated martensitic steels (such as 440 or 416 grade steel), CrCoFe alloys (such as stellite #3, stellite #6, and stellite #12), or other metals. Alternative materials with similar properties can be substituted without departing from the concept of this invention.

The preferred plug stem 102, plug stem base 103 and band retainer 108 is composed of materials selected for ease of machining to a smooth surface, having good tensile strength, reasonable ductility and cost effectiveness. Included within this class of materials are titanium and its alloys, zirconium and its alloys, niobium and its alloys, titanium-niobium alloys, alloy steels, carbon steels, iron-base superalloys, stainless steels, nickel and its alloys, nickel-base superalloys, copper based alloys, cobalt alloys, cobalt-base superalloys, aluminum and its alloys, magnesium alloys, tantalum and the like. Alternative materials with similar properties can be substituted without departing from the concept of this invention.

The preferred plug head band 104 is composed of metal alloys, including but not limited to titanium and its alloys, zirconium and its alloys, niobium and its alloys, titanium-niobium allows, alloy steels, carbon steels, iron-base superalloys, stainless steels, nickel and its alloys, nickel-base superalloys, copper based alloys, cobalt alloys, cobalt-base superalloys, aluminum and its alloys, magnesium alloys, tantalum and metals of similar properties. Alternative materials with similar properties can be substituted without departing from the concept of this invention.

The preferred dimensions of the plug head 101 of this invention has a diameter from 0.1 inches to 24 inches, depending on the specific valve application. Preferably, the plug head length would be approximately one to one and a half times the plug head diameter. Alternative dimensions are envisioned by the inventors and may be substituted without departing from the concept of this invention.

Figure 2:
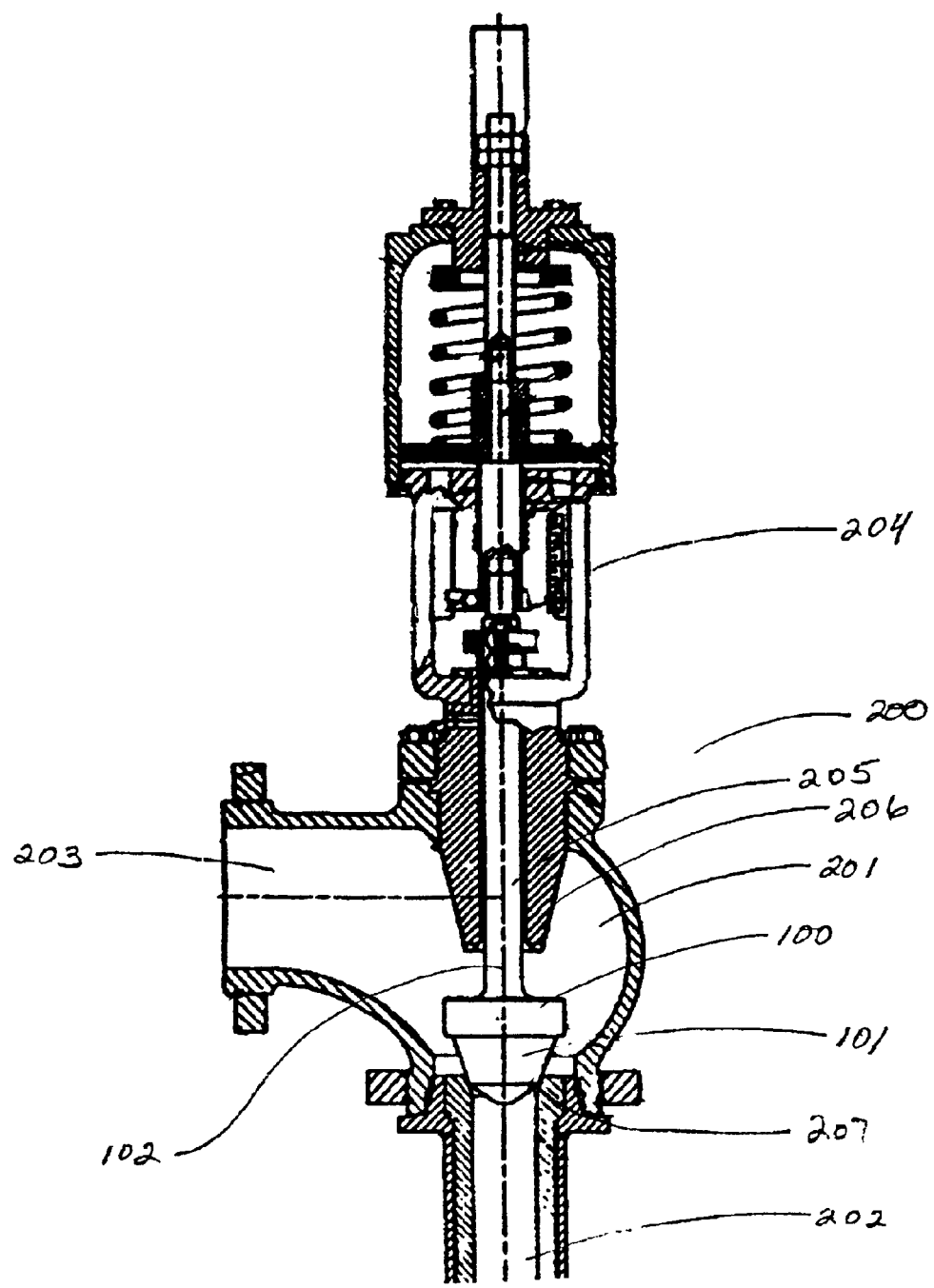
FIG. 2 depicts a representative system drawing of the preferred plug stem of this invention in a valve assembly.

FIG. 2 shows a representative system drawing of the preferred valve plug 100 of this invention in a valve assembly 200. The plug 100 is shown in a closed position with the plug head 101 closing a first flow path 203 from the valve chamber 201 and a second flow path 202. The valve plug 100 stem 102 is shown connected to the actuator 204 and sealed with the shaft 205 in close, preferably fluid tight proximity, with the valve stem support (or shaft support) packing 206. This drawing, FIG. 2, shows the preferred valve plug 100 of this invention in its working environment in a typical valve 200. The actuator 204 functions to position the valve plug 100 either in shown closed position or retracted to permit fluid flow from the first flow path 203 to the second flow path 202. Alternatively, the flow can, as is common in some valves, flow in the opposite direction.

Figure 3:
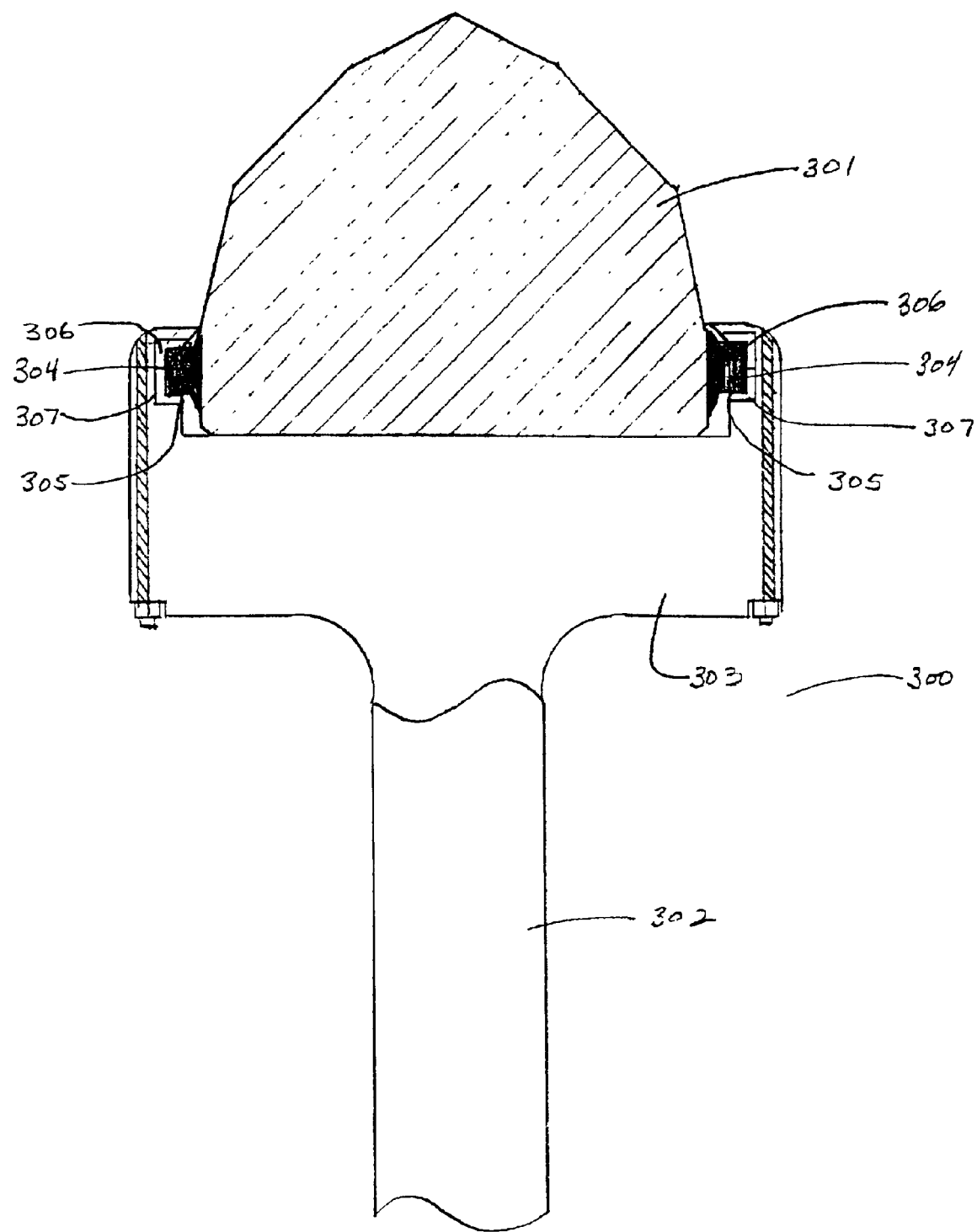
FIG. 3 depicts a section view of an alternative plug head mounted in the plug stem, this embodiment has additional compliance structure provided.

FIG. 3 shows section view of an alternative plug head mounted in the plug stem, this embodiment have additional compliance structure provided. This embodiment of the invention 300 has a plug head 301, a plug stem base 303, and a plug stem 301, as described in FIG. 1. The essential difference between this embodiment 300 of the invention and that described in FIG. 1 are a plurality of compliance barrier devices 306, 307 which fit within the recess 305 and around the plug head band 304. These compliance barrier devices 306, 307 provide alignment flexibility to the plug head 301 to its seat 207 in the valve.

Figure 4:
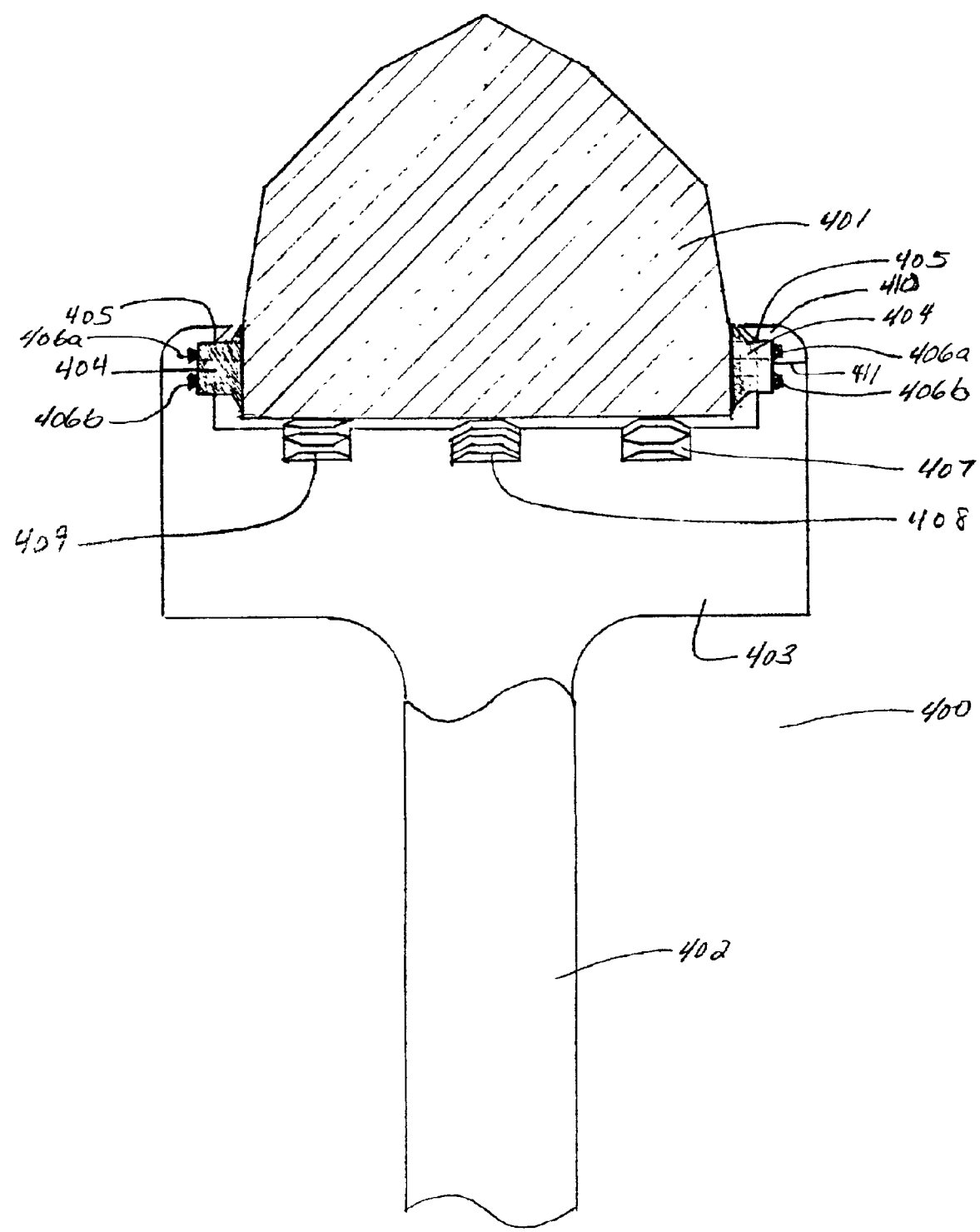
FIG. 4 depicts a section view of a second alternative embodiment of the invention, having a different fastener mechanism and having multiple embedded sensors for the communication of stress information.

FIG. 4 shows the section view of a second alternative embodiment of the invention, having a different fastener mechanism and having multiple embedded sensors for the communication of stress information. This embodiment 400 has a plug head 401 held in a plug stem base 403 which in turn is mounted on the plug stem 402, as described in detail above is reference to FIG. 1. The essential differences between this embodiment 400 and that described in reference to FIG. 1, is a substitute fastening means of fastening the retaining ring 410 to the plug stem base 403. In this embodiment the means of fastening is a weld, braze or the like 411, instead of the bolt or pin mechanism of FIG. 1. Also, this embodiment 400, has a plurality of vertical compliance devices 407, 408, 409. In this particular embodiment, the preferred vertical compliance devices are a variety of spring devices. Shown here are a parallel washer spring 408, a series-parallel washer spring 407, and a series washer spring 409. Preferably, the same spring type would be used in all compliance locations in the plug stem base 403. The three different types are shown here to demonstrate the variety of spring types available. Alternative, equivalent springs can be substituted without departing from the concept of this invention. Also, provided in this embodiment 400 are alignment-pressure sensors 406a,b. These sensors 406a,b could be positioned in a wide variety of alternative positions at the interface between the plug head 401 and the plug stem base 403, and are shown along the band 404.

The described embodiments, including the various materials specific components and dimensions, are to be considered in all respects only as illustrative and not as restrictive. The invention should not be considered limited to the particular preferred and alternative embodiments, rather the scope of the invention is indicated by the appended claims. All changes, modifications and alternatives which come within the meaning and range of equivalency of the claims are to be embraced as within their scope.

We claim:

1. A valve plug head assembly comprising:
   (A) a means for holding a valve plug head to a valve plug stem, having a plug stem base and a plug stem base cavity, wherein said means for holding further comprises a plug head band, fitted between said valve plug head and a recess in a side wall of said plug stem base cavity, said plug head band having a first side and a second side and having said second side fitted inside said recess in said plug stem base cavity; and a band retainer fitted over said plug head band; said valve plug head having a generally flat surface extending across and located in said plug stem base cavity and held in contact by said means for holding with said plug stem base and said plug head having a general convex surface extending outward from said plug stem base and said plug stem base cavity to thereby provide a means for said valve plug bead to entirely close off a flow path through a valve assembly, and (B) a means for fastening said means for holding to said valve plug stems wherein said means for fastening further comprises a means selected from the group consisting of a bolt, a pin, a screw, a weld, a braze, and a clamp.

2. A valve plug head assembly, as recited in claim 1, wherein said first side of said plug head band is greater in height than said second side of said plug head band.

3. A valve plug head assembly, as recited in claim 1, wherein said plug head is further comprised of a material selected from the group consisting of structural ceramics, cermets, cast irons, silicon irons, white irons, martensitic steels, and CrCoFe alloys.

4. A valve plug head assembly, as recited in claim 1, wherein said plug head band of said means for holding further is in contact with said valve plug head and said valve plug stem and wherein said plug head band is composed of a ductile material selected from the group consisting of titanium and its alloys, zirconium and its alloys, niobium and its alloys, titanium-niobium alloys, alloy steels, carbon steels, iron-base superalloys, stainless steels, nickel and its alloys, nickel-base superalloys, copper based alloys, cobalt alloys, cobalt-base superalloys, aluminum and its alloys, magnesium alloys, and tantalum.

5. A valve plug head assembly, as recited in claim 1, wherein said band is composed of a first material and said plug head is composed of a second material and where said first material is different from said second material.

* * * * *